(12) United States Patent
Choi et al.

(10) Patent No.: US 8,520,375 B2
(45) Date of Patent: Aug. 27, 2013

(54) DISPLAY APPARATUS

(75) Inventors: Hyun Yong Choi, Chuncheon-si (KR); Se Ki Jang, Hwaseong-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 432 days.

(21) Appl. No.: 12/755,559

(22) Filed: Apr. 7, 2010

(65) Prior Publication Data

US 2010/0259881 A1 Oct. 14, 2010

(30) Foreign Application Priority Data

Apr. 9, 2009 (KR) ........................ 10-2009-0030816

(51) Int. Cl.
*H05K 5/00* (2006.01)
*H05K 7/00* (2006.01)
*G06F 1/16* (2006.01)

(52) U.S. Cl.
USPC ............. 361/679.21; 361/679.22; 361/679.26

(58) Field of Classification Search
USPC ........................... 361/679.21, 679.22, 679.26
See application file for complete search history.

(56) References Cited

U.S. PATENT DOCUMENTS

| | | | |
|---|---|---|---|
| 6,507,352 B1 * | 1/2003 | Cohen et al. .................. 715/817 |
| 6,697,250 B2 * | 2/2004 | Kuo ........................... 361/679.6 |
| 7,619,881 B1 * | 11/2009 | Granville et al. ........ 361/679.21 |

* cited by examiner

*Primary Examiner* — Anthony Haughton
(74) *Attorney, Agent, or Firm* — Stanzione & Kim, LLP (57) ABSTRACT

A display apparatus improved in the structure to connect a board assembly having a personal computer (PC) function. The display apparatus includes a display module embodying an image, a supporting frame disposed at a rear part of the display module, a plurality of driving circuit boards mounted to the supporting frame to drive the display module, a guide member disposed at one side of the plurality of driving circuit boards, a board assembly removably connected to the guide member but not electrically connected with the driving circuit boards, and a rear cover covering the display module and the supporting frame while providing a space for the board assembly to be connected to the guide member with one side exposed.

21 Claims, 8 Drawing Sheets

DISPLAY APPARATUS

CROSS-REFERENCE TO RELATED APPLICATIONS

This application claims priority under 35 U.S.C. §119(a) of Korean Patent Application No. 10-2009-0030816, filed on Apr. 9, 2009 in the Korean Intellectual Property Office, the disclosure of which is incorporated herein by reference.

BACKGROUND

1. Field of the Invention

Embodiments of the present general inventive concept relate to a display apparatus improved in the connection structure with respect to a board assembly serving as a personal computer (PC).

2. Description of the Related Art

Generally, display apparatuses denote apparatuses such as TVs, computer monitors, and the like, which display images. The display apparatuses may be classified into a cathode-ray tube (CRT) type, a liquid crystal display (LCD) type, a plasma display panel (PDP) type, and a digital lighting processing (DLP) type according to methods of displaying images.

Among the above, the PDP type display apparatus has been spotlighted as a next-generation flat panel display since being capable of achieving a thin and large display panel. Especially, a PDP TV which is thin enough to be hung on the wall is getting more popular due to its spatial efficiency. This is referred to as a large flat display (LFD).

Recently, in accordance with development of the photographing function of digital camera, camcorder, mobile phones, and the like, the LFD type display apparatus is provided with various functional personal computer (PC) board assemblies so as to receive audio, video, and image signals of image data stored in an external device, as connected with the external device and display corresponding images through a display screen.

However, such a PC board assembly causes a difficulty in replacement in case of a disorder since being mounted at a rear side of the display apparatus. That is, the service efficiency will be deteriorated.

SUMMARY

The present general inventive concept provides a display apparatus improved in a connection structure with respect to a board assembly having a personal computer (PC) function.

Embodiments of the present general inventive concept will be set forth in part in the description which follows and, in part, will be obvious from the description, or may be learned by practice of the general inventive concept.

Embodiments of the present general inventive concept further include a support apparatus for a display unit including a supporting frame to support a display module, a guide member fixedly attached to the support frame, and an electronic board assembly slidably and elastically attachable to the guide member, where the electronic board assembly is not capable of directly driving the display unit.

Embodiments of the present general inventive concept further include a display apparatus with improved design for servicing, including a display module to display an image, a supporting frame to attach to the rear of the display module with a guide member integrally attached thereto, a plurality of driving circuit boards to mount to the supporting frame to drive the display module, and a motherboard assembly removably and elastically attachable to the guide member, wherein the motherboard has no influence on the direct operation of the display apparatus.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings in which.

DETAILED DESCRIPTION OF THE EXEMPLARY EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 1:
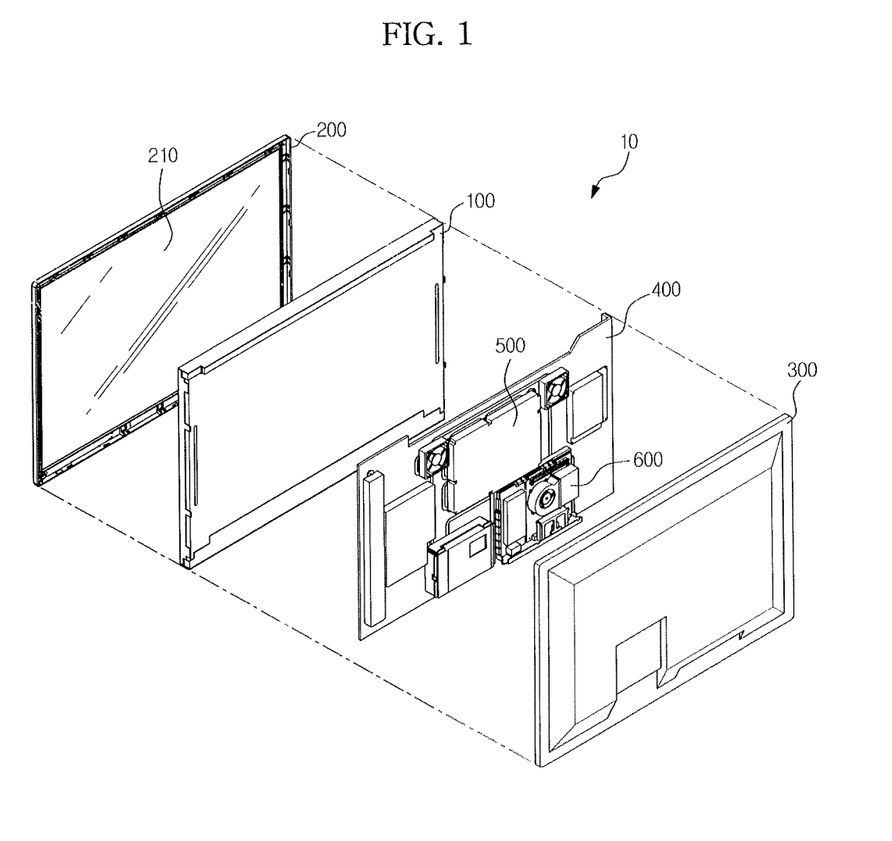
FIG. 1 is an exploded perspective view of a display apparatus according to an exemplary embodiment of the present general inventive concept.
Figure 2:
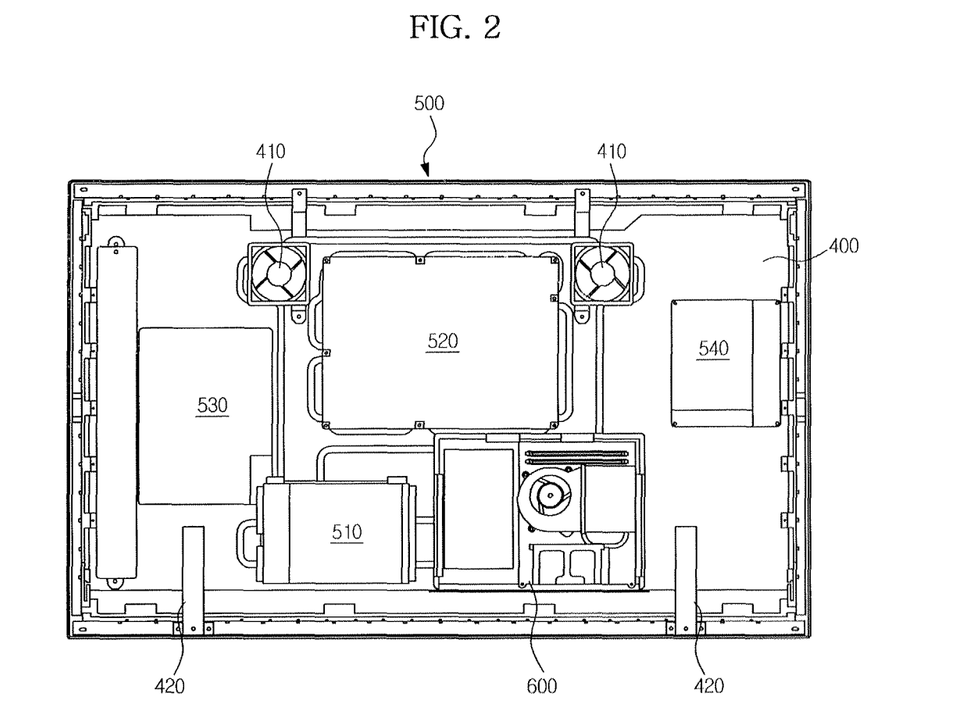
FIG. 2 is a view showing driving circuit boards of the display apparatus.

FIG. 1 is an exploded perspective view of a display apparatus according to an exemplary embodiment of the present general inventive concept and FIG. 2 is a view showing driving circuit boards of the display apparatus.

As illustrated in FIG. 1 and FIG. 2, a display apparatus 10 according to the exemplary embodiment of the present general inventive concept may include a display module 100 which displays images, a front cover 200 and a rear cover 300 connected to each other, thereby forming a receiving space, a supporting frame 400 disposed at a rear part of the display module 100, a plurality of driving circuit boards 500 connected to a rear side of the supporting frame 400, and a board assembly 600 having a personal computer (PC) function. The board assembly 600 may constitute a motherboard assembly having personal computer (PC) functionality.

The front cover 200 has a display window 210 so that the images displayed through the display module 100 are exposed to the outside. The front cover 200 may connect with the rear cover 300, thereby forming a space that receives the display module 100 and the supporting frame 400 and thus constituting the external appearance of the display apparatus 10. The display module 100 may employ any one of various methods using a flat panel display module, such as a liquid crystal display (LCD) type, a plasma display panel (PDP) type, and an organic electroluminescence (EL) type.

The supporting frame 400 is connected to the front cover 200 at the rear side of the display module 100. More specifically, the supporting frame 400 may connect to the front cover 200 as spaced by a predetermined distance from the rear side of the display module 100. The reason for keeping the space between the supporting frame 400 and the display module 100 is to restrain interference by heat of the plurality of driving circuit boards 500 mounted at the rear side of the supporting frame 400 and interference by noise among signals.

Here, the supporting frame 400 may be spaced from the display module 100 by forming a boss on a front side of the supporting frame 400 to be protruded toward the display module 100 or, alternatively, by bending both lateral sides of the supporting frame 400 forward.

The plurality of driving circuit boards 500 are connected to the rear side of the supporting frame 400. The driving circuit boards 500 may include circuit boards mounting circuit devices to drive the display module 100 by receiving a signal, processing the received signal and generating another signal to control the display model 100 to display an image corresponding to the signal. The connection between the plurality of driving circuit boards 500 and display module 100 may include multiple electrical connectors including, for example, multiple lead wiring connectors to connect and transfer a signal received by the driving circuit boards 500 to the display module 100. Furthermore, display module 100 and supporting frame 400 may connect using snap connectors on the side edges of the display module 100 for simple assembly of the display apparatus 10. More particularly, the plurality of driving circuit boards 500 may constitute a main board 510 disposed at a lower rear part of the supporting frame 400, a power board 520 disposed at a rear upper part of the supporting frame 400, a first inverter board 530 disposed on the rear left side of the supporting frame 400 to adjust brightness of the display module 100, and a second inverter board 540 disposed on the rear right side of the supporting frame 400 to adjust brightness of the display module 100.

The plurality of driving circuit boards 500 may mount with a plurality of power supply circuit devices to supply power to drive the display apparatus 10. For example, a connector (not illustrated) electrically connected to an external power line to input external power may be mounted at a lower periphery of the main board 510 and exposed to the outside as the rear cover 300 is connected. The main board 510 may include a power conversion circuit block such as an AC/DC regulator to convert the external power input through the connector to a driving power to drive the display module 100. Additionally, the plurality of driving circuit boards 500 may receive an outside signal via a signal receiver (not illustrated). The signal receiver may include, for example, an input terminal to receive an input signal as well as a tuner for signal conversion.

The board assembly 600 serving as a personal computer (PC), that is, the PC board assembly 600 is mounted on the right of the main board 510. Differently from the driving circuit boards 500 that may be directly related to driving of the display apparatus 10, the PC board assembly 600 may have no influence on the operation of the display apparatus 10 although being completely separated from the display apparatus 10. This is better understood from the fact that the PC board assembly 600 is capable of not being in constant electrical connection with the plurality of driving circuit boards 500 since the PC board assembly 600 is slidably removable from the support frame 400.

A fan 410 may be provided to discharge heat generated in the receiving space, and a speaker 420 may output sound. Also, the speaker 420 and fan 410 may connect to the plurality of circuit driving boards 500. Further, the speaker 420 and fan 410 may fix to the supporting frame 400, as illustrated in FIG. 1.

Figure 3:
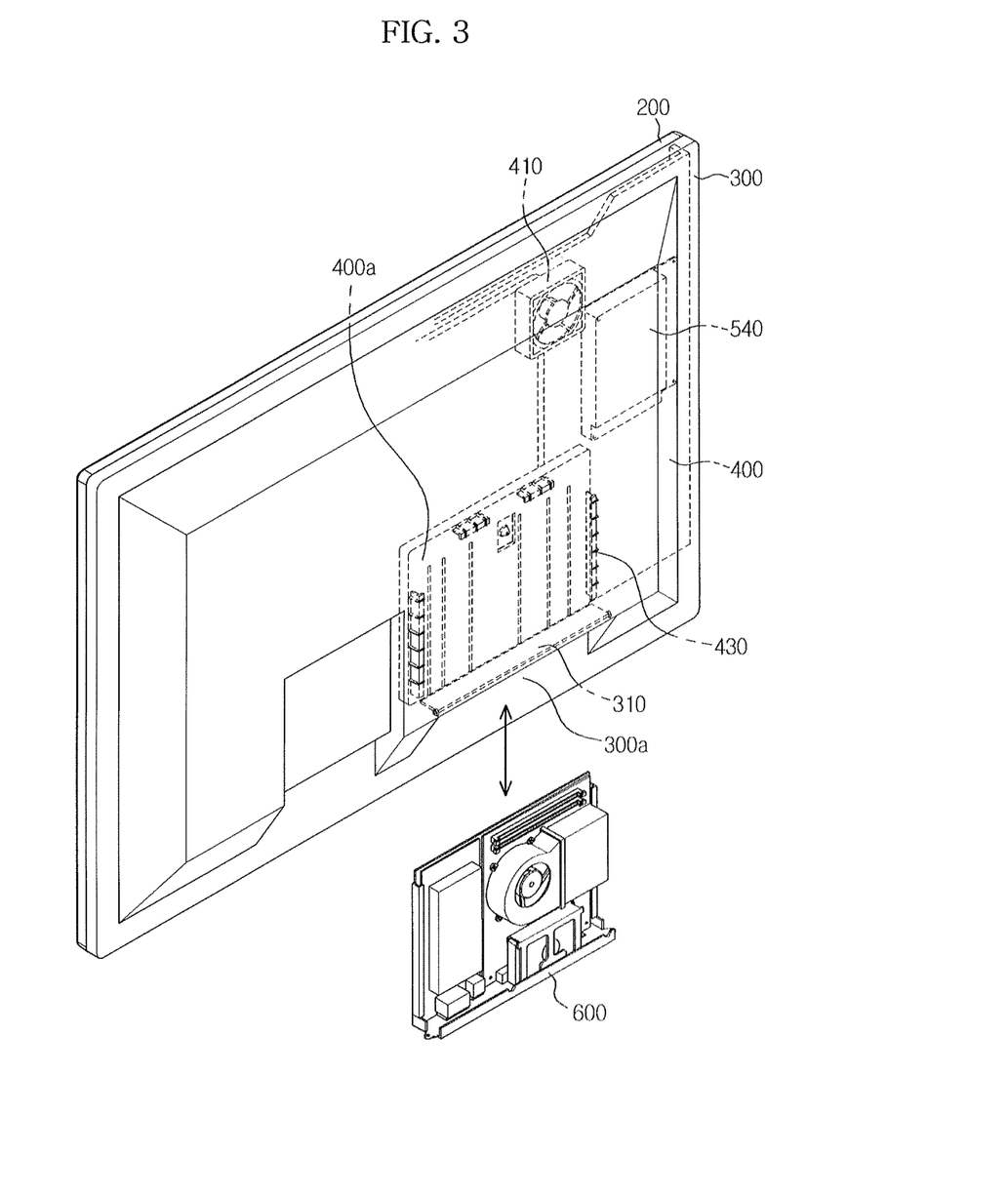
FIG. 3 is a view showing a personal computer (PC) board assembly separated from the display apparatus.
Figure 4:
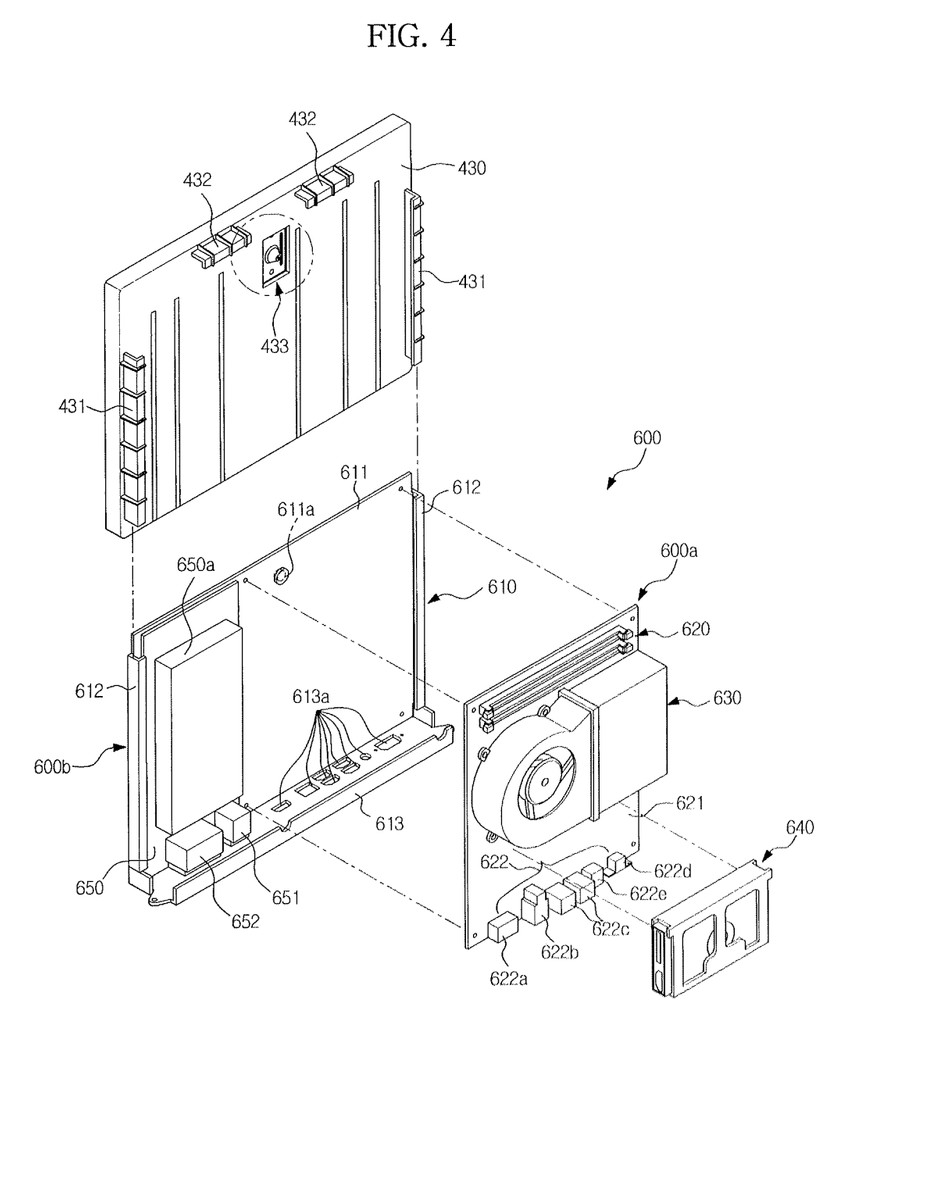
FIG. 4 is an exploded perspective view of the PC board assembly according to the exemplary embodiment of the present general inventive concept.
Figure 5:
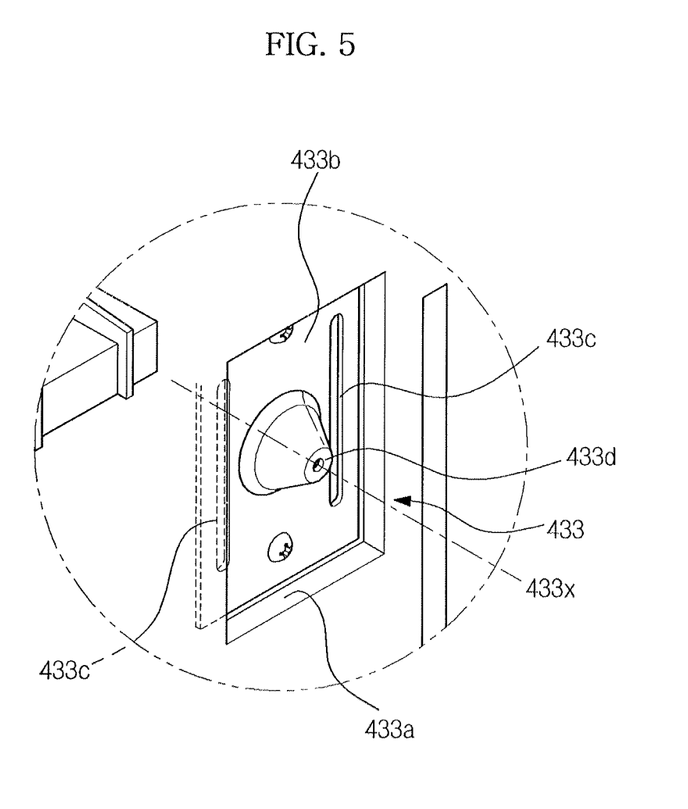
FIG. 5 is a partially enlarged view of FIG. 4.
Figure 6:
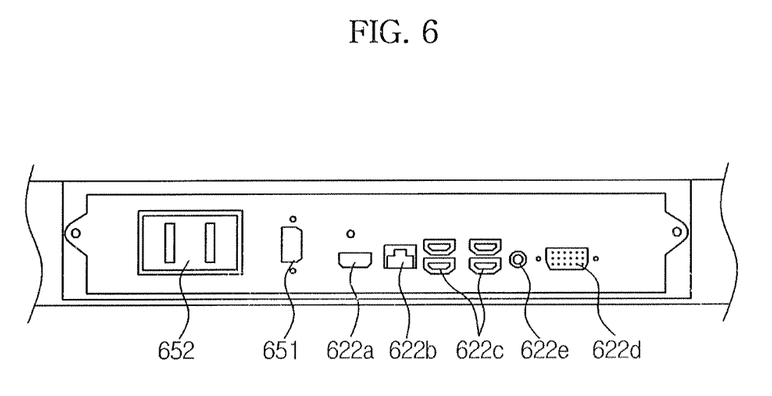
FIG. 6 is a bottom sectional view of the PC board assembly according to the exemplary embodiment of the present general inventive concept.

FIG. 3 illustrates a PC board assembly separated from the display apparatus, FIG. 4 is an exploded perspective view of the PC board assembly according to the exemplary embodiment of the present general inventive concept. FIG. 5 is a partially enlarged view of FIG. 4, and FIG. 6 is a bottom sectional view of the PC board assembly according to the exemplary embodiment of the present general inventive concept.

Referring to FIG. 3 to FIG. 6, the display apparatus 10 according to the exemplary embodiment of the present general inventive concept includes the PC board assembly 600 removably connected thereto.

The PC board assembly 600 is connected with an external device to receive audio, video, and image signals of image data stored in the external device and display corresponding images through a screen. For this, the PC board assembly 600 may include a computing unit 600*a* having a PC function, and a power unit 600*b* supplying power to the computing unit 600*a*. The computing unit 600*a* and the power unit 600*b* may be connected to the supporting frame 400 by fixing to a board casing 610. Further, the board assembly may insert into space 400*a* formed in the supporting frame 400 via opening 300*a* formed on the rear cover 300, as illustrated in FIG. 3.

The board casing 610 of the PC board assembly 600 is removably connected to the supporting frame 400 in a sliding manner. The board casing 610 may include a bottom part 611 having, for example, a rectangular panel form, bent parts 612 bent upward from both lateral ends of the bottom part 611, and a cover part 613 bent upward from a rear end of the bottom part 611 into a cover form.

The bottom part 611 has a predetermined size for the computing unit 600*a* and the power unit 600*b* to be securely mounted and fixed thereon. A connection recess 611*a* may be formed on a rear surface of the bottom part 611 to be elastically connected with a part of the supporting frame 400. The connection recess 611*a* is elastically connected and separated with respect to the part of the supporting frame 400 according to a sliding motion of the PC board assembly 600, which will be further explained with reference to FIG. 6 and FIG. 7.

In addition, the cover part 613 that covers one side of the board casing 610 may be integrally formed with the rear end of the bottom part 611. The bent parts 612, bent upward at both ends of the bottom part 611 to connect with the supporting frame 400, may also be integrally formed with the bottom part 611.

A plurality of through-holes 613*a* are formed on the cover part 613 at positions corresponding to a medium connection unit 622 so that the medium connection unit 622 is exposed to the outside therethrough. The bent parts 612 may be bent to have an L-shape sectional surface to be engaged with the supporting frame 400. However, since this is suggested only by way of example, the bent parts 612 may have other various forms as long as the bent parts 612 enable the PC board assembly 600 to be connected to and separated from the supporting frame 400.

The computing unit 600*a* may include a network board 620 fixed to the board casing 610 and connected to the external device to construct a network system, a fan 630 fixed to the network board 620, and a data storage unit 640 fixed to one side of the fan 630.

The network board 620 may include a board body 621 supported by the board casing 610, and the medium connection unit 622 formed at the board body 621 and connected with an external memory. The medium connection unit 622 may include a high-definition multimedia interface (HDMI) terminal 622*a*, a local area network (LAN) terminal 622*b* connected to an internet LAN cable, and a universal serial bus (USB) terminal 622c connected to a USB storage. In addition to the HDMI terminal 622a, the LAN terminal 622b, and the USB terminal 622c, the medium connection unit 622 may further include a power line communication (PLC) terminal, a power of Ethernet (POE) terminal, a wide broadband (WiBro) terminal, a code division multiple access (CDMA) terminal, and a global system for mobile communication (GSM) terminal. Also, the network board 620 may further include a memory terminal connected with various sizes and types of external memories according to the various technologies.

The USB storage connected to the USB terminal 622c may be a USB memory stick, which may store data, or other various devices used in connection with the USB terminal such as a personal digital assistant (PDA), a digital camera, and a camcorder.

The network board 620 may include various types of the medium connection units 622 each prepared in single, or a plurality of frequently used medium connection units 622. Here, the various medium connection units 622 may be properly arranged in consideration of the frequency of use according to the user. In particular, the medium connection units 622 should be properly spaced from one another considering that a plurality of external memories may be simultaneously connected. Undescribed reference numerals 622d and 622e represent an RS232 terminal and an earphone jack connector, respectively.

The fan 630 may be mounted at an upper part of the network board 620 to discharge heat generated from the network board 620. The fan 630 also discharges heat generated in the display apparatus 10 by being disposed in the receiving space between the front cover 200 and the rear cover 300.

The power unit 600b may include a network power board 650. A plurality of power supply circuit devices are mounted on the network power board 650 so as to supply power required to drive the network board 620. The network power board 650 may include a first power connector 651 input with external power to drive the computing unit 600a and a second power connector 652 branched from the first power connector 651 to drive the plurality of driving circuit boards 500.

The first and the second power connectors 651 and 652 may be exposed to the outside and structured such that the power supplied to the first power connector 651 is transmitted to the connector (not illustrated) of the main board 510 through the second power connector 652.

A guide member 430 may be fixedly mounted to a rear part of the supporting frame 400 to guide removable connection of the PC board assembly 600. Although the guide member 430 may be integrally formed with the supporting frame 400, the guide member 430 of the present exemplary embodiment may be separately formed and fixed to the supporting frame 400.

The guide member 430 according to the exemplary embodiment of the present general inventive concept may include guide parts 431 formed at both lateral ends to guide connection with the PC board assembly 600, a sub guide part 432 formed at a front end of the guide member 430 to restrict a sliding range of the PC board assembly 600, and a fixing part 433 to fix the position of the PC board assembly 600.

The guide parts 431 and the sub guide part 432 may have a substantially L shape to engage with the PC board assembly 600 but may have any other form as long as the guide parts 431 and the sub guide part 432 are removably engaged with the PC board assembly 600.

The fixing part 433 may include a fixing recess 433a disposed in the center of the guide member 430. Also, the fixing part 433 may include a rectangular fixing board 433b fixedly mounted in the fixing recess 433a, slits 433c formed on both sides of the fixing board 433b, and a fixing protrusion 433d protruded upward from the fixing board 433b between the slits 433c. The above-structured fixing part 433 enables the PC board assembly 600 to be stably and slidably connected with the guide member 430. Therefore, in case that any part is broken, replacement of the part may be performed easily and stably, thereby improving the service efficiency.

The rear cover 300 may include a blocking member 310 to prevent a space where the PC board assembly 600 comes in and out from being exposed when the PC board assembly 600 is completely separated from the guide member 430, as illustrated in FIG. 3. That is, the rear cover 300 covers the display module 100 and the supporting frame 400 while providing a space for the PC board assembly 600 to be connected to the guide member 430 with one side exposed.

Hereinafter, the process of connecting and separating the PC board assembly 600 and the guide member 430 will be described.

Figure 7:
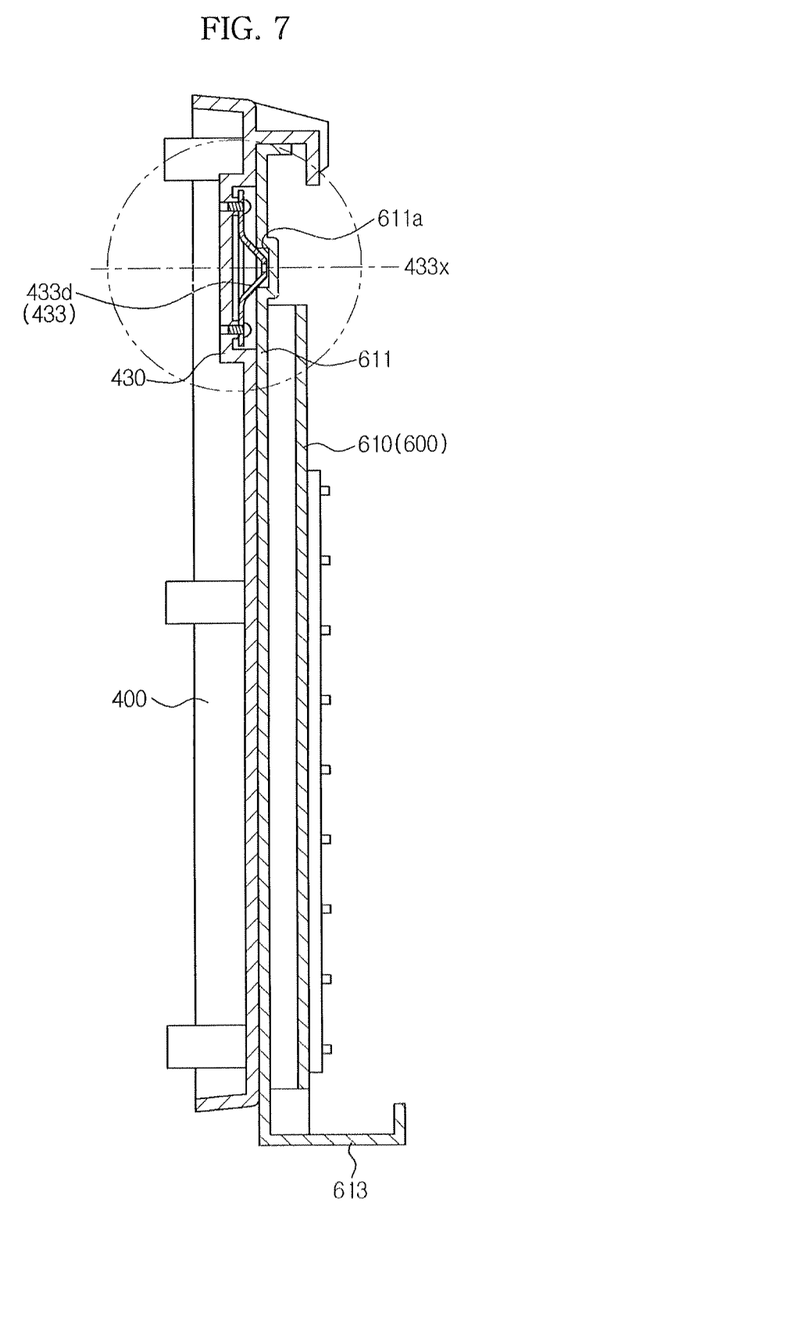
FIG. 7 is a view showing the process of connecting the PC board assembly.
Figure 8:
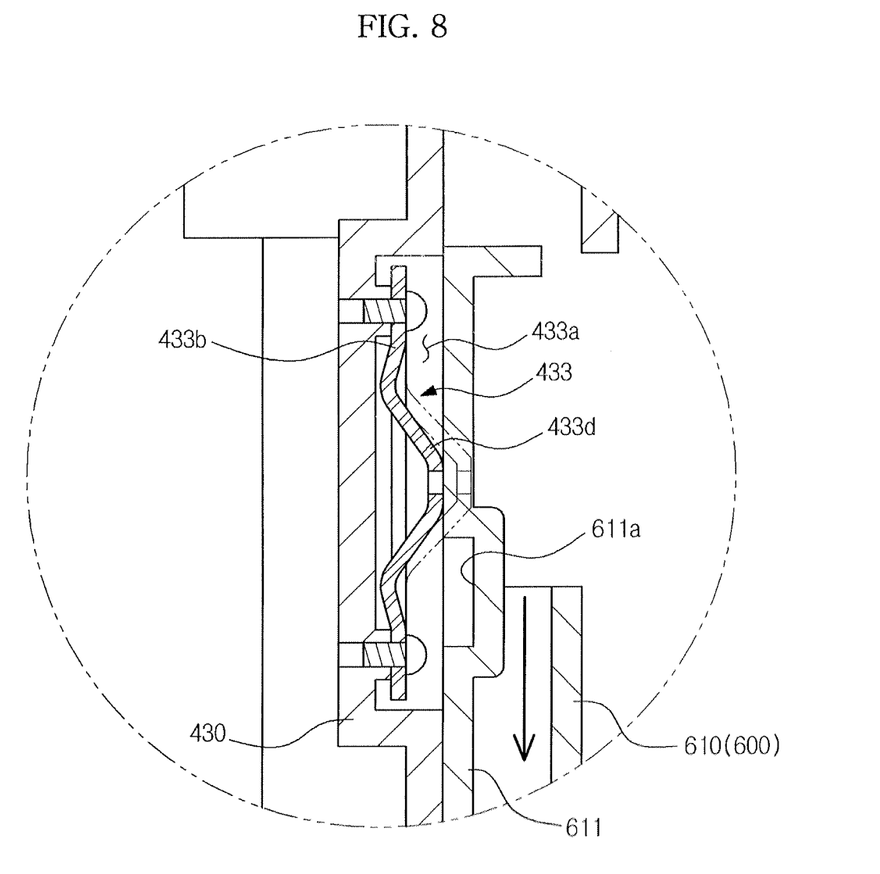
FIG. 8 is a partially enlarged view of FIG. 7.

FIG. 7 illustrates the process of connecting the PC board assembly 600. FIG. 8 illustrates an enlarged portion of FIG. 7.

As illustrated in FIG. 7 and FIG. 8, after the guide member 430 is fastened to the rear side of the supporting frame 400, the PC board assembly 600 is inserted in the guide member 430. Here, the PC board assembly 600 is inserted between the guide parts 431 bent upward at both ends of the guide member 430.

Here, since the bent parts 612 are formed at the both ends of the board casing 610 corresponding to the guide parts 431, the PC board assembly 600 is engaged with the guide member 430 in a sliding manner. When the PC board assembly 600 is slid forward, the sub guide part 432 formed at the front end of the guide member 430 may prevent excessive sliding of the PC board assembly 600.

Meanwhile, when the PC board assembly 600 is slid forward, the connection recess 611a formed on the rear surface of the board casing 610 may elastically connect with the fixing part 433 of the guide member 430 so that the connection recess 611a and fixing protrusion 433d align along the alignment axis 433x. In other words, the fixing protrusion 433d of the guide member 430 may elastically connect with the connection recess 611a of the PC board assembly 600 as the PC board assembly 600 is engaged with the guide member 430, thereby effectively preventing unexpected separation of the PC board assembly 600 caused by an external impact. Accordingly, in case that the display apparatus 10 is a wall-hanging type, separation of the PC board assembly 600 may be prevented even while the PC board assembly 600 is being replaced through a rear lower part of the display apparatus 10, as illustrated in FIG. 4. As a result, the service efficiency may be improved.

Although a few exemplary embodiments of the present general inventive concept have been illustrated and described, it would be appreciated by those skilled in the art that changes may be made in these exemplary embodiments without departing from the principles and spirit of the general inventive concept, the scope of which is defined in the claims and their equivalents.

What is claimed is:

1. A display apparatus comprising:
   a display module to display an image;
   a supporting frame disposed at a rear part of the display module;
   a plurality of driving circuit boards mounted to the supporting frame to drive the display module;
   a guide member disposed at one side of the plurality of driving circuit boards;

a board assembly removably connected to the guide member but not electrically connected with the driving circuit boards; and a rear cover covering the display module and the supporting frame while providing a space between the rear cover and the supporting frame for the board assembly to be removably connectable to the guide member with one side exposed without removing the rear cover from the display module.

2. The display apparatus according to claim 1, wherein the board assembly comprises:

a computing unit having a personal computer (PC) function; and a power unit to supply power to the computing unit.

3. The display apparatus according to claim 2, wherein the computing unit comprises:

a network board connected to an external device.

4. The display apparatus according to claim 2, wherein the power unit comprises:

a first power connector input with external power to drive the computing unit; and a second power connector branched from the first power connector to supply power to the driving circuit boards; wherein the first and second power connectors are exposed to the outside as the board assembly is connected to the guide member through the space.

5. The display apparatus according to claim 2, wherein the board assembly comprises:

a board casing to fix the computing unit and the power unit thereto and to connect to the guide member.

6. The display apparatus according to claim 3, wherein the computing unit further comprises:

a fan fixedly mounted to the network board; and a data storage unit fixed to one side of the fan.

7. The display apparatus according to claim 5, wherein the board casing comprises:

a bottom part having a rectangular panel form; and bent parts bent upward from both lateral ends of the bottom part to be inserted in the guide member.

8. The display apparatus according to claim 7, wherein the guide member comprises:

at least one fixing part which is elastically connected with at least one connection recess formed on the bottom part as the board assembly is slid forward and backward.

9. The display apparatus according to claim 8, wherein the guide member comprises:

at least two guide parts formed at both lateral ends thereof to guide insertion of the bent parts; and at least one sub guide part formed at a front end of the guide member to restrict a sliding range of the board assembly.

10. The display apparatus according to claim 8, wherein a space defined by the guide part and the sub guide part has the width and length corresponding to the board assembly.

11. The display apparatus according to claim 1, wherein the rear cover comprises:

a blocking member preventing a space where the PC board assembly comes in and out from being exposed when the PC board assembly is separated from the guide member.

12. The display apparatus according to claim 1, further comprising:

a medium connection unit formed at one side of the board assembly exposed to the outside as the board assembly is connected to the guide member through the space, so as to achieve communication with an external device or the plurality of driving circuit boards, wherein the medium connection unit comprises at least one of a high-definition multimedia interface (HDMI) terminal, a universal serial bus (USB) terminal, and a local area network (LAN).

13. The display apparatus according to claim 1, wherein the display module employs at least one of a liquid crystal display (LCD) type, a plasma display panel (PDP) type, and an organic electroluminescence (EL) type.

14. The display apparatus according to claim 1, further comprising:

a fan disposed at both upper sides of the supporting frame to discharge heat generated in a receiving space formed between a front cover and the rear cover; and a speaker disposed at both lower sides of the supporting frame to output sound.

15. The display apparatus according to claim 1, wherein the driving circuit boards comprise:

a main board mounted at a rear side of the supporting frame;

a power board mounted at one side of the main board; and first and second inverter boards mounted at both sides of the power board, respectively.

16. A support apparatus for a display unit comprising:

a front cover to display an image thereon;

a rear cover coupled to the front cover to protect the rear of the display unit;

a supporting frame disposed between the front cover and the rear cover to support a display module;

a guide member fixedly attached to the support frame; and an electronic board assembly slidably and elastically attachable to the guide member, where removal of the electronic board assembly from the guide member occurs without decoupling of the front and rear covers.

17. The support apparatus of claim 16, wherein the electronic board assembly is removably insertable into the guide member.

18. The support apparatus of claim 16, wherein the support apparatus further comprises:

a rear cover to provide protection to the rear surface of the supporting frame while providing a space for the electronic board assembly to connect with the guide member.

19. The support apparatus of claim 16, wherein the guide member further comprises:

a fixing part to secure alignment of the electronic board assembly with the guide member.

20. The display apparatus according to claim 1, wherein the support member is spaced apart from the display module by a predetermined distance.

21. The support apparatus of claim 1, wherein the board assembly is independent from an operation of the display apparatus.

* * * * *